United States Patent Office 3,248,420
Patented Apr. 26, 1966

3,248,420
PROCESS FOR MAKING THE ACETATES OF
TRINITRO-AZA-ALKYLNITRATES
Gustave B. Linden, Short Hills, N.J., assignor to Aerojet-General Corporation, Azusa, Calif., a corporation of Ohio
No Drawing. Filed Apr. 9, 1962, Ser. No. 186,272
2 Claims. (Cl. 260—490)

This invention relates to novel polynitro esters and to the method for their preparation.

It is an object of this invention to prepare new polynitro compounds. It is another object of this invention to prepare new polynitro compounds which are suitable plasticizers for polymeric binders used in solid rocket propellants. These and other objects of this invention will be apparent from the description which follows.

The novel polynitro esters of my invention have the following general formula.

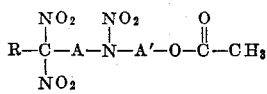

wherein R is selected from the group consisting of lower alkyl and lower nitroalkyl, i.e., those groups having from 1 to about 8 carbon atoms such as methyl, neopentyl, 2-nitropropyl, 2,4-dinitrohexyl, etc. A and A' are lower alkylene radicals such as ethylene, pentamethylene, and decamethylene. In the above formula R, A, and A' may be branched or straight chain.

Compounds of this invention may be prepared by the reaction of acetic acid or acetic anhydride with a compound of the formula:

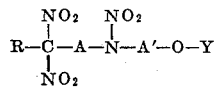

wherein Y is selected from the group consisting of hydrogen and nitro. This reaction may, if desired, be carried out in the presence of an acid catalyst such as sulfuric acid. In the above reaction the proportions of the reactants are not critical. Preferably the acetic acid or acetic anhydride is used in excess since this has been found to increase the rate of ester formation.

The reaction may be conveniently carried out over a wide temperature range. Preferably the reaction temperature is within the range of from about 0° C. to about 130° C., and more preferably between about 80° C. and 110° C. since these temperatures produce the most satisfactory reaction rate.

The reaction may be carried out in the absence of solvents, since the acetic acid or acetic anhydride will normally serve as a solvent for the alcoholic reactant. However, optionally inert solvents may be employed in the reaction mixture. For example, the reaction will proceed in the presence of water.

The reaction may be carried out at any pressure without any substantial adverse result. Normally the reaction is conducted at atmospheric pressure since this is most convenient.

The polynitro esters of this invention are normally solids and can be isolated in conventional manner such as by crystallization, filtration, and/or evaporation. While not essential, it is sometimes advantageous to agitate the reactants, such as by a mechanical stirrer, to produce a more intimate contact, and thus a more uniform rate of reaction.

To more clearly illustrate my invention the following examples are presented. It is to be understood however that these examples are intended merely as illustrative embodiments of the invention and should not be construed as limitative of the scope of said invention in any way. In the examples percentages are by weight unless otherwise indicated.

EXAMPLE I

*Preparation of 3,5,5-trinitro-3-aza-1-hexyl acetate from 3,5,5-trinitro-3-aza-1-hexyl nitrate*

To 50 g. of 3,5,5-trinitro-3-aza-1-hexyl nitrate was added proportionwise a solution of 18 ml. sulfuric acid in 170 ml. technical acetic anhydride at 90–100° C. The reaction was exothermic and the temperature was controlled with intermittent use of an ice bath. The solid dissolved rapidly with gas evolution. The mixture was held 5 minutes longer at 90° C. and poured onto ice. The resultant oil crystallized. The crude 3,5,5-trinitro-3-aza-1-hexyl acetate was isolated by filtration and washed well with water. The crystals obtained were recrystallized twice from methanol to yield 30.5 g. (62%) of 3,5,5-trinitro-3-aza-1-hexyl acetate, having a melting point of 55–56° C.

EXAMPLE II

*Preparation of 3,5,5-trinitro-3-aza-1-hexyl acetate from 3,5,5-trinitro-3-aza-1-hexanol*

A solution of 0.1 g. of 3,5,5-trinitro-3-aza-1-hexanol in excess acetic anhydride was refluxed 5 minutes and diluted with ice. The crude solid was recrystallized from methanol to yield a colorless 3,5,5-trinitro-3-aza-1-hexyl acetate having a melting point of 56–57° C.

The 3,5,5-trinitro-3-aza-1-hexyl nitrate used in Example I may be prepared from 3,5,5-trinitro-3-aza-1-hexanol as is disclosed in U.S. Patent No. 2,934,558, issued April 26, 1960.

The 3,5,5-trinitro-3-aza-1-hexanol employed in Example II may be prepared by the reaction of 3,5,5-trinitro-3-aza-1-hexanoyl chloride with sodium borohydride as is disclosed in more detail in U.S. Patent No. 3,000,957, issued September 19, 1961.

In similar fashion acetic anhydride or acetic acid may be reacted with: 2,4,4-trinitro-2-aza-1-pentanol, 7,9,9-trinitro-7-aza-1-decylnitrate, and 3,5,5,7,7-pentanitro-3-aza-1-octyl nitrate to form: 2,4,4-trinitro-2-aza-1-pentyl acetate, 7,9,9-trinitro-7-aza-1-decyl acetate, and 3,5,5,7,7-pentanitro-3-aza-1 octyl acetate, respectively.

The novel polynitro esters of this invention, because of their high nitro content, are inherently useful as explosives. These compounds also may be used as plasticizers for polymeric binder materials such as the polyurethanes and nitro-containing polyurethanes used as binders in solid rocket propellants.

It will be understood that various modifications may be made in this invention without departing from the spirit thereof or the scope of the appended claims.

I claim:

1. The process for making compounds of the formula:

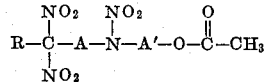

which comprises reacting a member of the group consisting of acetic anhydride and acetic acid with a compound of the formula:

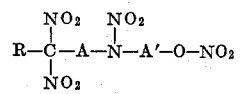

wherein in the above formulae R is selected from the group consisting of lower alkyl and lower nitroalkyl, and A and A' are lower alkylene radicals.

2. A method for preparing 3,5,5-trinitro-3-aza-1-hexyl acetate which comprises reacting 3,5,5-trinitro-3-aza-1-hexyl nitrate with acetic anhydride.

References Cited by the Examiner

UNITED STATES PATENTS

| | | | |
|---|---|---|---|
| 2,267,302 | 12/1941 | Hass et al. | 260—488 |
| 2,934,558 | 4/1960 | Frankel | 260—632 X |
| 2,967,195 | 1/1961 | Gold | 260—486 |
| 2,978,474 | 4/1961 | Klager | 260—534 X |
| 2,978,476 | 4/1961 | Klager | 260—534 X |
| 2,978,483 | 4/1961 | Vanneman | 260—534 X |
| 2,978,497 | 4/1961 | Frankel | 260—534 |
| 2,994,714 | 8/1961 | Saunders | 260—486 |
| 3,000,935 | 9/1961 | Vanneman | 260—534 |
| 3,025,318 | 3/1962 | Van Dolah | 260—486 |

References Cited by the Applicant

"Organic Chemistry," volume 2, by Henry Gilman, John Wiley and Sons Inc., New York, N.Y., second edition, (1945), pages 1842–1945.

LORRAINE A. WEINBERGER, *Primary Examiner.*

ABRAHAM H. WINKELSTEIN, LEON ZITVER,
*Examiners.*